United States Patent [19]

Artieri

[11] Patent Number: 5,151,976
[45] Date of Patent: Sep. 29, 1992

[54] DEVICE FOR CONVERTING A LINE SCANNING INTO A VERTICAL SAW TOOTH SCANNING THROUGH STRIPES

[75] Inventor: Alain Artieri, Meylan, France

[73] Assignee: SGS-Thomson Microelectronics S.A., Gentilly, France

[21] Appl. No.: 557,862

[22] Filed: Jul. 26, 1990

[30] Foreign Application Priority Data

Jul. 27, 1989 [FR] France .................. 89 10385

[51] Int. Cl.⁵ .............................................. G06F 15/68
[52] U.S. Cl. ..................................... 395/166; 395/164; 340/747
[58] Field of Search ........ 364/518, 521, 200 MS File, 364/900 MS File; 340/747, 750; 395/166, 164

[56] References Cited

U.S. PATENT DOCUMENTS

| | | | |
|---|---|---|---|
| 4,451,852 | 5/1984 | Masuda et al. ........................ | 358/230 |
| 4,472,732 | 9/1984 | Bennett et al. ........................ | 358/22 |
| 4,985,849 | 1/1991 | Hideaki ................................ | 364/518 |
| 4,991,127 | 2/1991 | Crookshanks ..................... | 364/571.04 |
| 4,992,960 | 2/1991 | Yamaoka et al. ..................... | 364/521 |

FOREIGN PATENT DOCUMENTS

3136029A1  3/1983  Fed. Rep. of Germany.

*Primary Examiner*—Gary V. Harkcom
*Assistant Examiner*—Phu K. Nguyen
*Attorney, Agent, or Firm*—Lowe, Price, LeBlanc & Becker

[57] ABSTRACT

A device for converting a horizontal scanning of successive lines of N data into a saw tooth scanning of stripes having a height of M lines. This device comprises a MN word memory wherein are sequentially written the first MN data, then wherein the following data are sequentially written while the existing data are read out at same successive addresses $A_{i,j}$. The value of i determines the sequence number of the data of the memory ($0 < i < MN - 1$), and the value of j determines a stripe number ($1 < j < n$). An address generator supplies addresses $A_{i,j}$ so that $A_{i+1,j} = (A_{i,j} + x_j)$ Modulo($MN - 1$), $x_j$ being a number such that $x_{j+1} = N.x_j$ Modulo($MN - 1$) and $x_j = 1$.

4 Claims, 2 Drawing Sheets

DEVICE FOR CONVERTING A LINE SCANNING INTO A VERTICAL SAW TOOTH SCANNING THROUGH STRIPES

BACKGROUND OF THE INVENTION

In various applications of image processing or more generally of data processing, it is desired to convert an image resulting from a horizontal line scanning into an image resulting from a vertical saw tooth scanning into image stripes. Thus, as illustrated in FIG. 1, considering an image comprising successive lines of N image elements (pixels), each of which corresponds to a data word, it is desired to carry out a saw tooth reading into stripes of M lines, as illustrated in FIG. 1.

The most conventional way for realizing such a conversion consists in using two RAM memories each having the size of a stripe of MN data. The data corresponding to the first line scanning are stored in the first memory, and then are read in the desired order of the saw tooth scan into stripes while the data of the next stripe are written in the other memory, and so on, the two memories are alternatively read and written.

This method has the obvious drawback of requiring two memories with their independent addressing systems.

The invention provides for using a single memory of MN words for realizing this operation and also provides for a circuit permitting automatic supply of addresses, wherein data will be simultaneously read and written in selected memory cells.

SUMMARY OF THE INVENTION

To achieve those objects, the invention provides a device for converting a horizontal scanning of successive lines of N data into a saw tooth scanning into stripes having a height of M lines. The device includes a MN word memory wherein are sequentially written the first MN data then wherein the next data are sequentially written while the existing data are read out of the same successive addresses $A_{i,j}$, i determining a serial number of the data in the memory ($0<i<MN-1$) and j a stripe number ($1<j<n$). The device further includes an address generator for supplying addresses $A_{i,j}$, wherein $A_{i+1,j}=(A_{i,j}+x_j)$ Modulo(MN-1), $x_j$ being a number such that $x_{j+1}=N.x_j$ Modulo(MN-1) and $x_1=1$.

According to an embodiment of the invention, the address generator comprises a first register with a value $x_j$; a second register with the address value ($A_{i,j}$); an adder adding the output of the first register and the output of the second register ($x_j+A_{i,j}$); means (S2, SEL1) for transferring the lowest of the positive values ($x_j+A_{i,j}$) and $[x_j+A_{i,j}-(MN-1)]$ towards the second register; and means for transferring value ($x_{j+1}$), at each stripe change, into the first register ($x_j$) and clear the second register ($A_{0,j}$).

BRIEF DISCLOSURE OF THE DRAWINGS

The foregoing and other objects, features and advantages of the invention will be apparent from the following detailed description of preferred embodiments as illustrated in the accompanying drawings wherein:

FIG. 1 schematically illustrates the object the invention aims to attain, that is, converting a line scanning into a vertical saw tooth line scanning through stripes;

DESCRIPTION OF A PREFERRED EMBODIMENT

Figures 1, 2, 3, 4, 5:
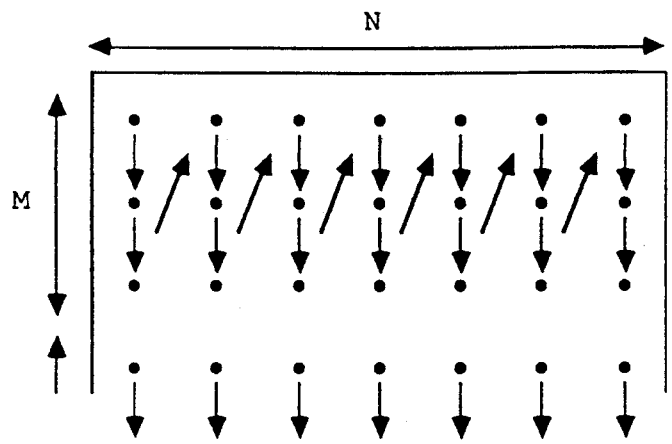
FIG. 2-5 show successive memory fillings according to the invention.

The object of the invention will be disclosed in relation with FIGS. 2-5 which represent the successive contents of a single M×N RAM memory. In the given example, it is assumed that this memory corresponds to a stripe comprising three (M=3) lines of seven (N=7) words, the memory cells being numbered from 0 to 20. Initially, as shown in FIG. 2, sequential data are written in the corresponding cells.

Once the memory is filled, it is read according to a saw tooth order, that is:

0 7 14 1 8 15 2 9 16 3 10 17 4 11 18 5 12 19 6 13 20

After each reading of a cell, the incoming horizontal datum is written in the cell that has just been read. Therefore, the cells are filled with successive data as indicated in FIG. 3.

Then, it is again necessary to successively look for data 0, 7, 14, ... to produce the saw tooth output. It will be noted from FIG. 3 that they are at the successive addresses:

0 9 18 7 16 5 14 3 12 1 10 19 8 17 6 15 4 13 2 11 20

FIG. 4 shows the sequential horizontal data written in the corresponding cells, namely, datum 0 is in cell 0, datum 1 is in cell 9 where was datum 7, datum 2 is in cell 18 where was datum 14, and so on.

If it is desired to read the memory contents of FIG. 4 in the saw tooth data order 0, 7, 14 ..., memory cells are to be read in the following order:

0 3 6 9 12 15 18 1 4 7 10 13 16 19 2 5 8 11 14 17 20 and the memory cell is again written with incoming horizontal scan data during each read step. The corresponding filling is illustrated in FIG. 5. It can be seen that, if it is desired to read the data of FIG. 5 in the 0, 7, 14 .. ., saw tooth order, a filling identical to that of FIG. 2 is achieved and the cycle is repeated until all image stripes are read.

The successive addressing addresses of the RAM memory could be stored in ROM memories but this would require a very high memory capacity, at least equal to that of the second RAM memory existing in the above discusses two-RAMs prior art embodiment.

Thus, the invention provides for a circuit capable of generating successive addresses $A_{i,j}$, where i designates the address of a memory cell (an address ranging from 0 to 20 in the above example) and where j corresponds to a stripe number. Thus, i is included between 0 and MN-1, N being the number of words in a line, M the number of lines in a stripe and j is a stripe number which in incremented by one unit when the next stripe is processed.

Figure 6:
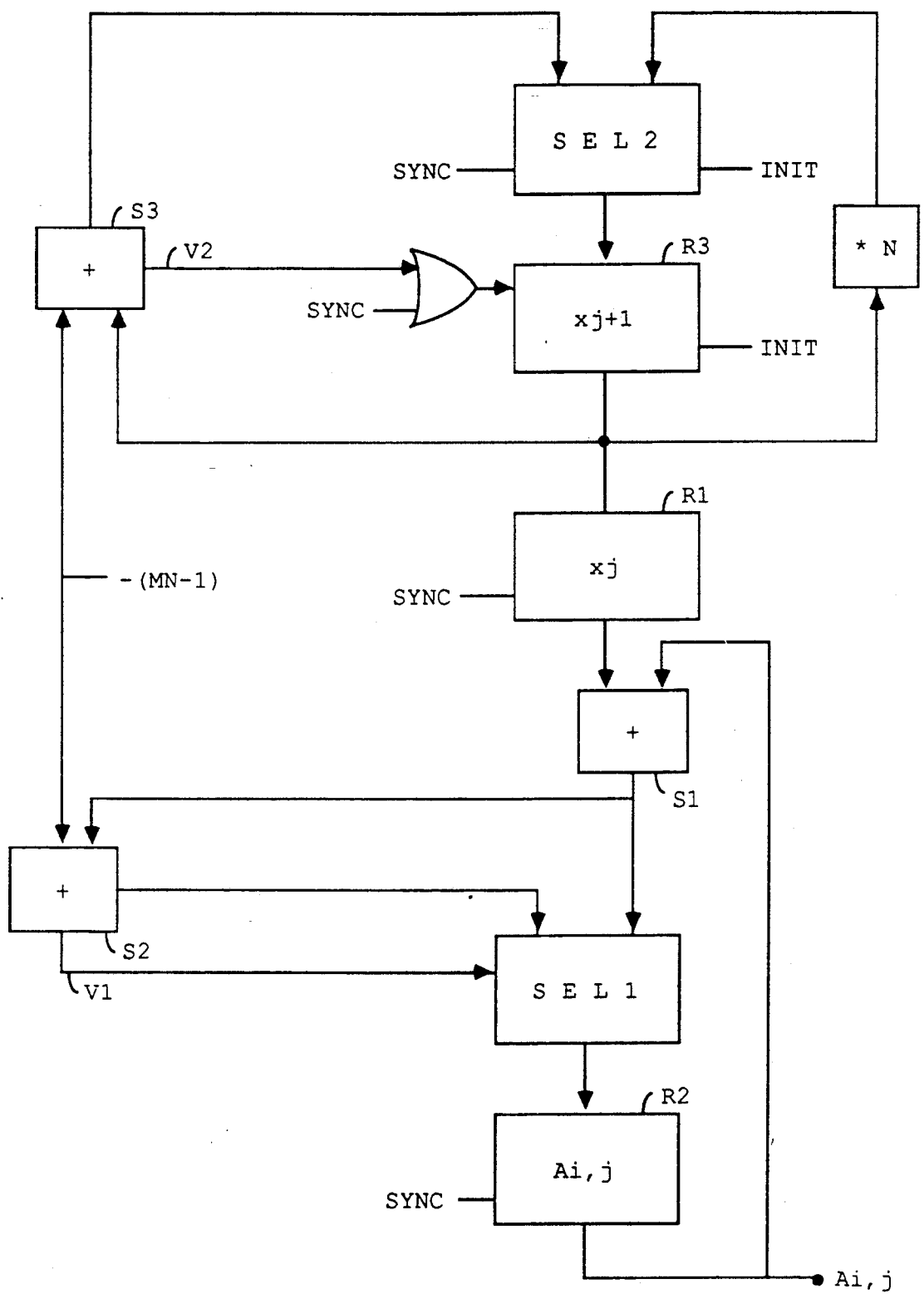
FIG. 6 shows a circuit for generating the desired successive addresses of the memory addressing.

An embodiment of the address generating circuit according to the invention is illustrated in FIG. 6. It comprises a first register R1 for storing a value $x_j$, this register being initially set to 1. A second register R2 contains the current value of address $A_{i,j}$. The outputs of registers R1 and R2 are supplied to a first adder S1, the output of which is sent, on the one hand, to a selection circuit SEL1 and, on the other hand, to a second adder S2 which subtracts the value (MN-1) from the output S1. Adder S2 comprises an enabling output V1 which indicates if the result of the operation is strictly positive. This output is sent to selector SEL1 which receives as a second input the output of adder S2. Thus, if signal V1 indicates that the result of S2 is positive, selector SEL1 selects the output of S2; otherwise, it selects the output of S1 for sending it into register R2 and supplying a new $A_{i,j}$ value. The set comprising the S1, S2, SEL1 and R2 circuits is actuated according to the address sequence (data clock) and supplies addresses $A_{i,j}$ for successive values of i.

When passing from one stripe to the next, that is, when value j is incremented, a synchronization signal SYNC resets the address value in register R2 and writes in register R1 a next value $(x_{j+1})$ of value $x_j$.

This value $x_{j+1}$ can be obtained as illustrated in the upper portion of FIG. 6. The output of a register R3, which initially corresponds to the content of register R1, is applied to a selection circuit SEL2 after multiplication by N. The output of circuit SEL2 is sent to register R3 designed to store the value $x_{j+1}$, at least at each signal SYNC which is a signal occurring every MN data clock pulse at each change of stripe (stripe clock). The output of register R3 is also sent to an adder S3 which subtracts value MN-1 from the value it contains. Like adder S2, adder S3 comprises an enabling output V2 indicating whether the result of the operation is strictly positive. The output of adder S3 is sent to a second input of the selection circuit SEL2 and replaces its preceding output value. If the result is strictly positive, signal V2 sent through an OR gate to register R3 causes the output value of the selector to be transferred into register R3; if it is negative or null, the register content is not modified.

With the operation of adders S2 and S3 and of selectors SEL1 and SEL2, it will be noted that one obtains:

$$x_{j+1} = Nx_j \text{ Modulo}(MN-1), \text{ and}$$

$$A_{i+1,j} = (A_{i,j} + x_j) \text{ Modulo}(MN-1).$$

Here, the operation A Modulo(MN-1) is defined by:

| | |
|---|---|
| A Modulo(MN-1) = A | if A < MN-1. |
| A Modulo(MN-1) = MN-1 | if A = MN-1, and |
| A Modulo(MN-1) = A-(MN-1) as long as A > MN-1. | |

A Modulo (MN-1)=A-(Mn-1) as long as A>MN-1.

Considering exemplary values such as those of FIGS. 2-5, it will be noted that those operations cause the tables to be filled as above described.

The circuit according to the invention is particularly simple and will generally have a much smaller surface on a silicon chip than the ROM memories containing the successive addresses of successive memory blocks containing an image stripe.

Moreover, it will be appreciated in the above circuit that value $x_{j+1}$ has to be available only at every MN data clock pulse, during the occurrence of signal SYNC, that is, the circuit of the upper portion of FIG. 6 is liable to operate relatively slowly and therefore the multiplier by N does not need to be a sophisticated high-speed multiplier.

Indeed, considering the period of time immediately following the occurrence of a signal SYNC while register R3 contained the value $x_j$ it has just transferred into register R1, this register R3 reveives the value $Nx_j$ calculated during the preceding clock cycle. The loop S3, SEL2, R3 permits replacement, within a few data clock cycles, of this value $Nx_j$ with $Nx_j$ Modulo(MN-1) which is the new value $x_{j+1}$. Then, the multiplier can use the remaining period of the stripe clock cycle for calculating the value $Nx_{j+1}$ which will be transferred to selector SEL2 at the occurrence of signal SYNC.

In order to avoid waiting for an initial time of multiplication, one will provide for initialization inputs INIT towards register R3 and selector SEL2 for introducing for example the initial values 1 into R3 and N into SEL2 during the first cycle.

On the other hand, it will be noted that the circuit according to the invention inversely permits conversion of a saw tooth stripe scanning into a line scanning by simply changing in the multiplier constant N by constant M.

According to an aspect of the invention, it will be noted that the values of $x_j$ are regularly repeated according to a cycle which depends upon the size of the considered stripe. This cycle was equal to 4 in the example of FIGS. 2-5. Calculation shows that for 8-lines stripes the cycle will be:

844 for lines of 720 data
39 for lines of 721 data
20 for lines of 722 data
13 for lines of 1024 data
182 for lines of 1025 data
1316 for lines of 1026 data Those specific examples are given because the 720-data and 1024-data lines correspond to possible cases for a digital TV signal. It can be seen that, for some stripe sizes, only a small number of values $x_j$ appears (20 for 8 lines of 722 data and 13 for 8 lines of 1024 data). Consequently, according to a variant of the invention, in case of a circuit designed for a specific application, it will be possible to replace the circuits calculating the values $x_j$ appearing on the upper part of FIG. 6 with a ROM storing the few specific values of $x_j$.

Moreover, it will be noted that, if for a specific application a large number of values $x_j$ is obtained (above mentioned case of 720 data), it will be possible to choose an imaginary higher number (722 data) to obtain a small number of values $x_j$, the excess data being eliminated (in case of a TV signal, they will appear during the line retrace period).

In order to obtain an inverse conversion of saw tooth into line scanning, it will suffice to read the data stored in the ROM in the inverse direction with respect to the initially provided direction for the conversion of line scanning into saw tooth scannning.

I claim:

1. A device for converting a horizontal scanning of successive lines of N data into a saw tooth scanning of stripes, each stripe having a height of M lines, said device comprising:

M×N words of memory, wherein are sequentially written into the first MN horizontally scanned data then wherein following horizontally scanned data are sequentially written while stored data are read out at same successive addresses $A_{i,j}$ to provide saw tooth scanning output data, where i is a sequence number of the data in the memory (0<i<MN-1) and j is a stripe number (1<j<n); and an address generator circuit for supplying said addresses $A_{i,j}$ to said memory, wherein $A_{i+1,j} = (A_{i,j} + x_j)$ Modulo (MN-1), $x_j$ being a number such that $x_{j+1} = N.x_j$ Modulo (MN-1) and $x_1 = 1$.

2. A device according to claim 1, wherein the address generator circuit comprises:

a first register for the value $x_j$;
a second register for an address value $(A_{i,j})$;

an adder for adding the output of the first register and the output of the second register $(x_j+(A_{i,j});$ means for transferring the lowest of the positive values $(x_j+(A_{i,j}))$ and $(x_j+(A_{i,j})-(MN-1))$ towards the second register; and means for transferring value $(x_{j+1})$ into the first register $(x_j)$, at each stripe change, and clearing the content of the second register $(A_{0,j})$.

3. A device according to claim 2, wherein the address generator circuit includes means for prestoring values $x_j$.

4. A device according to claim 2, wherein the address generator circuit includes means for supplying the values $x_j$, said means for supplying comprising:

a multiplier by a N receiving the value $x_j$ and supplying $Nx_j$; and a third register receiving the lowest of the positive values $Nx_j$ and $Nx_j$ Modulo $(MN-1)$.

* * * * *